United States Patent
Hong

(10) Patent No.: US 11,002,534 B2
(45) Date of Patent: May 11, 2021

(54) PATTERNED LIGHT PROJECTION APPARATUS AND METHOD

(71) Applicant: KOH YOUNG TECHNOLOGY INC., Seoul (KR)

(72) Inventor: Jong Kyu Hong, Anyang-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 357 days.

(21) Appl. No.: 16/081,999

(22) PCT Filed: Mar. 3, 2017

(86) PCT No.: PCT/KR2017/002352
§ 371 (c)(1),
(2) Date: Sep. 4, 2018

(87) PCT Pub. No.: WO2017/150948
PCT Pub. Date: Sep. 8, 2017

(65) Prior Publication Data
US 2020/0333135 A1    Oct. 22, 2020

(30) Foreign Application Priority Data

Mar. 4, 2016  (KR) .................. 10-2016-0026310

(51) Int. Cl.
*G01B 11/25* (2006.01)
*G02B 27/42* (2006.01)

(52) U.S. Cl.
CPC .......... *G01B 11/254* (2013.01); *G02B 27/425* (2013.01)

(58) Field of Classification Search
CPC ... G01B 11/254; G01B 11/2513; G01B 11/25; G01B 11/2545; G02B 27/425;
(Continued)

(56) References Cited

U.S. PATENT DOCUMENTS 3,685,418 A * 8/1972 Moriyama ............... G03B 9/06
396/510
3,802,769 A * 4/1974 Rotz ...................... G02B 30/26
352/43
(Continued)

FOREIGN PATENT DOCUMENTS

CA      2 475 391      1/2005
JP    2006-527372     11/2006
(Continued)

OTHER PUBLICATIONS http://brassgoggles.co.uk/forum/index.php?topic=1530.0.*
(Continued)

*Primary Examiner* — Mohamed K Amara
(74) *Attorney, Agent, or Firm* — Kile Park Reed & Houtteman PLLC

(57) ABSTRACT

A patterned light irradiation apparatus is enclosed. The patterned light irradiation apparatus comprises a light source, a pattern grating, an aperture, wherein the pattern grating includes a striped shape in a form including repetition of a transmission part and a shielding part, and the aperture includes an opening having a sinusoidal wave-shaped cross section. When the patterned light irradiation apparatus irradiates patterned light to a subject, the patterned irradiation apparatus performs defocusing and thus can irradiate patterned light having an ideal sinusoidal form to the subject. Therefore, a three-dimensional image of high quality can be acquired.

14 Claims, 7 Drawing Sheets

(58) Field of Classification Search
CPC ............. G02B 26/101; G02B 26/0808; H04N 13/365; G01N 21/956; G03B 21/625; G03B 21/602; G03F 7/70283; G03F 7/70616; G03H 2001/0224; G03H 2210/22

See application file for complete search history.

(56) References Cited

U.S. PATENT DOCUMENTS

| | | | | |
|---|---|---|---|---|
| 4,588,276 | A * | 5/1986 | Kaise | G03B 9/06 396/508 |
| 4,671,414 | A * | 6/1987 | Bandt | B65B 9/02 206/526 |
| 6,735,333 | B1 * | 5/2004 | Yonezawa | G01N 21/956 356/237.1 |
| 7,119,911 | B2 * | 10/2006 | Tyczka | G01B 11/254 356/603 |
| 8,284,392 | B2 * | 10/2012 | Lampalzer | G01B 11/2513 356/237.1 |
| 8,437,533 | B2 * | 5/2013 | Kim | G01N 21/95607 382/141 |
| 8,770,780 | B1 * | 7/2014 | Jang | G09F 19/12 362/147 |
| 9,036,900 | B2 * | 5/2015 | Sato | G03H 1/0866 382/154 |
| 9,201,315 | B2 * | 12/2015 | De Boer | G03F 7/70666 |
| 9,275,292 | B2 * | 3/2016 | Jeong | G01B 11/2531 |
| 2002/0014577 | A1 * | 2/2002 | Ulrich | H01L 21/00 250/205 |
| 2002/0177054 | A1 * | 11/2002 | Saitoh | G03F 1/30 430/22 |
| 2003/0230015 | A1 * | 12/2003 | Mouyal | G09F 1/08 40/488 |
| 2004/0066565 | A1 * | 4/2004 | Woods | G03B 9/06 359/739 |
| 2004/0233440 | A1 * | 11/2004 | Mieher | G03F 7/70625 356/401 |
| 2005/0084771 | A1 * | 4/2005 | Nolscher | G03F 1/36 430/5 |
| 2005/0200940 | A1 | 9/2005 | Emer | |
| 2006/0103932 | A1 * | 5/2006 | Relke | G03B 21/62 359/462 |
| 2006/0109482 | A1 | 5/2006 | Duval et al. | |
| 2008/0123348 | A1 * | 5/2008 | Chang | H01F 7/066 362/321 |
| 2009/0028423 | A1 * | 1/2009 | Sandstrom | G03F 1/84 382/149 |
| 2009/0066929 | A1 * | 3/2009 | Tropf | G01B 11/2513 356/3.12 |
| 2009/0103103 | A1 * | 4/2009 | Berner | G01B 11/254 356/497 |
| 2009/0213354 | A1 * | 8/2009 | Sandstrom | G03F 7/701 355/71 |
| 2010/0046050 | A1 * | 2/2010 | Kroll | G03H 1/2294 359/9 |
| 2010/0103485 | A1 * | 4/2010 | Haussler | G03H 1/02 359/9 |
| 2011/0080471 | A1 * | 4/2011 | Song | G01B 11/245 348/46 |
| 2014/0022356 | A1 * | 1/2014 | Fisker | A61B 5/441 348/47 |
| 2014/0198320 | A1 | 7/2014 | Park | |
| 2015/0131066 | A1 * | 5/2015 | Yamazoe | G03F 1/70 355/53 |
| 2015/0205126 | A1 * | 7/2015 | Schowengerdt | G06F 3/011 345/633 |
| 2016/0220104 | A1 * | 8/2016 | Bauer | G01N 21/954 |
| 2016/0327906 | A1 * | 11/2016 | Futterer | G03H 1/2286 |

FOREIGN PATENT DOCUMENTS

| | | |
|---|---|---|
| JP | 2014-163812 | 9/2014 |
| KR | 10-2006-0106256 | 10/2006 |
| KR | 10-2006-0132641 | 12/2006 |
| KR | 10-0663323 | 1/2007 |
| KR | 10-2009-0089946 | 8/2009 |
| KR | 10-2013-0039130 | 4/2013 |
| KR | 10-2014-0032665 | 3/2014 |

OTHER PUBLICATIONS

Korean Final Office Action, with English translation, corresponding to 10-2016-0026310, dated Nov. 28, 2019.
Extended European Search Report for European Application No. 17 76 0352, dated Mar. 8, 2019.
Korean Office Action with English translation for Korean Application No. 10-2016-0026310, dated May 10, 2019.
International Search Report for International Application No. PCT/KR2017/002352, dated May 25, 2017.
Chinese Office Action, with English translation, corresponding to Chinese Application No. or Publication No. 201780015242.X, dated Mar. 30, 2020.

* cited by examiner

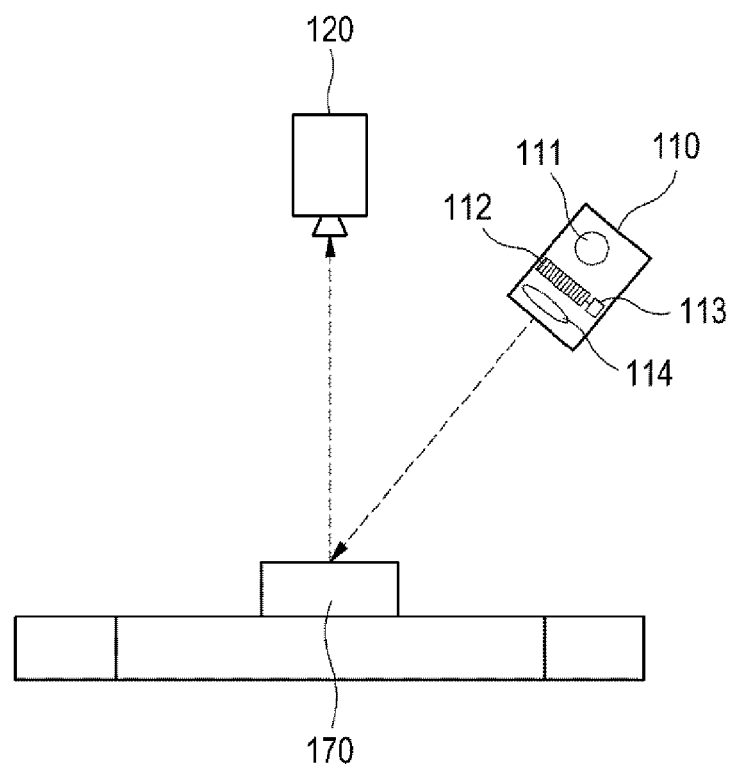

PATTERNED LIGHT PROJECTION APPARATUS AND METHOD

TECHNICAL FIELD

The present disclosure relates to a patterned light projection apparatus and a method thereof, and more specifically, to a patterned light projection apparatus and a method thereof that projects patterned light to a measurement object by passing light from a light source through a grating or by projecting a pattern image using an optical panel.

BACKGROUND

In general, a three-dimensional shape measuring apparatus measures a three-dimensional shape of the measurement object by projecting the patterned light generated using the grating and capturing a reflected image of grating-patterned light. The light projection apparatus for projecting the patterned light utilizes a scheme in which a grating for forming patterned light having a predetermined pattern, for example, patterned light of a sinusoidal form (or patterned light in the form of a sinusoidal wave), is located in front of a light source such that light from the light source is projected in the form of patterned light through the grating.

FIG. 1 illustrates a configuration of a patterned light projector configured to project patterned light for measuring an image of a substrate and a measuring device configured to measure an image, in a conventional substrate inspecting apparatus. A patterned light projection apparatus 110 includes a light source 111, a grating 112 (also referred to as a "pattern grating"), a grating transferring device 113, and a lens 114. The light emitted from the light source 111 passes through the grating 112, generating patterned light, the patterned light is projected onto an inspection target substrate 170, and the projected image is measured by a camera 120. A technique has been utilized in which a three-dimensional image is formed from a Moire pattern that is generated when an inspection target substrate is irradiated with patterned light with different phases by projecting the patterned light while changing the phase thereof. As a method for changing the phase of patterned light, a method is employed in which the grating transferring device 113 including a piezoelectric transducer (PZT) transmits fine vibration to the grating 112, thereby changing the phase of the patterned light.

Recently, a method of projecting a pattern image using an optical panel has been utilized instead of forming patterned light by passing light from a light source through a pattern grating. By using the optical panel, it is possible to irradiate an object with patterned light, of which the phase changes merely by sequentially projecting a plurality of different pattern images. Thus, a configuration such as a pattern grating or a mechanical grating transferring device using a PZT may be unnecessary. Specifically, such a digital patterned light projection apparatus is advantageous in that it is possible to easily adjust not only the phase of the patterned light but also the width of the pattern (i.e., the pitch of the pattern) by simply changing the digital image of the patterned light, and thus the digital patterned light projection apparatus is widely used.

A substrate inspection apparatus irradiates an object with a predetermined patterned light according to the method described above, and captures an image formed on the object irradiated with the patterned light. Further, the substrate inspection apparatus generates a three-dimensional image using a method of measuring the height by applying a bucket algorithm to each pixel of the captured image. In the case where the light and dark patterns of the patterned light is a sinusoidal stripe pattern, that is, in the case where the change of the lightness and darkness of the bright portions and the dark portions is in a pattern following a sinusoidal wave curve, the measurement quality of the three-dimensional image can be enhanced.

However, when the patterned light is formed using a light source and a grating, it is impossible to form patterned light of a sinusoidal form using a physically simple striped grating due to the linearity of light. That is, when a general stripe grating in which transmissive portions (opening portions) and shielding portions are alternately formed is used, light passes through the transmissive portions (opening portions) and light is blocked in the shielding portions, whereby merely a simple striped patterned light is formed in a region irradiated with the pattern region. Therefore, it is difficult to acquire patterned light of a sinusoidal form for acquiring a three-dimensional image by the method of using the simple striped grating.

Therefore, a pattern grating as illustrated in FIG. 2A is used for projecting patterned light of a sinusoidal form. In a pattern grating 220 of FIG. 2A, the transmittance of respective portions of the pattern grating varies in the vertical direction. Thus, when the light from the light source is passed through the pattern grating 220 as illustrated in FIG. 2B, it is possible to project patterned light 230 having a horizontal stripe pattern varying in lightness and darkness that is similar to a sinusoidal wave in the vertical direction. The pattern grating 220 of FIG. 2A is an example of a case where the transmittance of light varies in four steps, in which the pattern grating 220 has a central portion 221 capable of transmitting light the most and a shielding portion 224 blocking light the most, with portions 222 and 223 having an intermediate transmittance in the middle of the transmittances of the central portion 221 and the shielding portion 224 being disposed therebetween. That is, the portions 223 and 222 having the intermediate transmittance are arranged symmetrically across the light blocking portion 224 as a center.

When light from the light source passes through the pattern grating as illustrated in FIG. 2A, a pattern in which lightness and darkness vary in the measurement object is formed as the amount of light passing through each portion of the pattern grating is changed. As illustrated in FIG. 2B, the entire amount of light from the light source can pass through the portion 221 of the pattern grating 220, and light passing through this portion 221 forms the brightest portion 231 of the pattern on the surface of the object. Further, all light is blocked in the portion 224, and thus, the darkest portion 234 of the pattern is formed on the surface of the object. In the portions 222 and 223, only a part of the light passes according to the respective transmittances of the portions 222 and 223, and thus, slightly darkened patterns are formed on the surface of the object. As described above, the surface of the object is irradiated with the patterned light 230 in which lightness and darkness are periodically changed in the vertical direction.

By using such a pattern grating 220, it is possible to project patterned light having a sharp change in lightness and darkness compared with the case where a striped grating 112 is used. However, in the case of the patterned light generated through the pattern grating 220 illustrated in FIG. 2A, the lightness and darkness of the pattern are merely varied in four steps. Thus, there is a problem that the change in the lightness and darkness of the actual patterned light is still different from the change in the lightness and darkness of a sinusoidal wave. In order to make the patterned light generated through such a pattern grating similar to the sinusoidal wave, it is necessary to further refine the steps of lightness and darkness of the pattern grating, which increases fabrication cost and difficulty of the pattern grating.

In addition, since there is a minimum size of a pattern that can be processed when fabricating a pattern grating, there is a problem in that even if it is intended to further subdivide the change in lightness and darkness of the pattern grating, the size for displaying the change in lightness and darkness of one period, that is the pitch of the pattern, cannot be reduced to a certain level or less. Further, since it is necessary to project the patterned light using a fixed pattern grating, there may be a disadvantage in that in order to project the patterned light having different pitches, it is necessary to interrupt imaging to replace the grating or it is necessary to use a plurality of patterned light projection apparatuses.

Meanwhile, recently, a method of projecting patterned light using a digital projector using an LCD, an LCOS, or a Digital Micromirror Device (DMD) is utilized. In this case, even if a separate pattern grating is not used, it is possible to irradiate a target region with the patterned light by simply projecting a pattern image with the projector. In comparison with the method of using a pattern grating as described above, there are advantages in that the required cost can be reduced and patterned light having various pitches can be formed and projected more easily.

However, even in this method, a large number of pixels are required to project patterned light in a sinusoidal form. That is, in order to project patterned light in which lightness and darkness are varied in a sinusoidal wave form, the degree of variation of the lightness and darkness of the pattern can be further subdivided. In order to subdivide the change in lightness and darkness of the pattern, more pixels would be needed to express a pattern image. However, since the size of the pixels is fixed, there is a limit in that the pitch cannot be reduced below a certain level. In addition, a problem may also occur in that the capacity of a pattern image increases.

SUMMARY

It is an object of the present disclosure to provide an apparatus and a method for solving the above-described problems and efficiently forming and projecting patterned light of a sinusoidal form.

A patterned light projection apparatus according to one embodiment of the present disclosure is a patterned light projection apparatus including: a lens that is positioned on an optical path such that light beams from a light source pass through a grating and an aperture and converge on an irradiated surface, wherein the grating has a striped pattern in which transmissive portions configured to transmit light from the light source and shielding portions configured to block the light from the light source are alternately arranged, and wherein a light pattern is formed on the irradiated surface in a sinusoidal shape by adjusting the grating and the aperture through which the light beams from the light source pass.

A patterned light projection apparatus according to another embodiment of the present disclosure is a patterned light projection apparatus including: a lens that is positioned on an optical path such that light beams from a light source pass through an aperture and converge on an irradiated surface, wherein the light source is configured to project an image having a striped pattern, and a light pattern is formed on the irradiated surface in a sinusoidal shape by adjusting the aperture through which the light beams from the light source pass.

In the patterned light projection apparatus according to another embodiment of the present disclosure, the sinusoidal shape is adjustable by changing a size of an opening of the aperture.

In the patterned light projection apparatus according to another embodiment of the present disclosure, the sinusoidal shape is adjustable by changing a distance between the light source and the grating, a distance between the grating and the aperture, or a distance between the aperture and the light source.

In the patterned light projection apparatus according to another embodiment of the present disclosure, the sinusoidal shape is adjustable by changing a distance between the aperture and the light source.

In the patterned light projection apparatus according to another embodiment of the present disclosure, an opening of the aperture has a combined shape that is obtained by combining curves to be symmetrical to each other.

In the patterned light projection apparatus according to another embodiment of the present disclosure, the combined shape is a circular shape or an elliptical shape.

In the patterned light projection apparatus according to another embodiment of the present disclosure, an opening of the aperture has a combined shape that is obtained by combining two half-period sinusoidal wave shapes to be symmetrical to each other with respect to a direction perpendicular to the striped pattern.

In the patterned light projection apparatus according to another embodiment of the present disclosure, an opening of the aperture has a polygonal shape.

In the patterned light projection apparatus according to another embodiment of the present disclosure, a vertical width of a shadow that is caused by the shielding portions of the grating and formed at a position of the aperture is equal to or larger than a vertical width of an opening of the aperture.

In the patterned light projection apparatus according to another embodiment of the present disclosure, a vertical width of a dark portion of the striped pattern that is formed at a position of the aperture is equal to or larger than a vertical width of an opening of the aperture.

In the patterned light projection apparatus according to another embodiment of the present disclosure, the light source is one of a light source of a Digital Light Processing method using a DMD element, an LED light source, and an LCD light source.

In the patterned light projection apparatus according to another embodiment of the present disclosure, the light source uses a Digital Light Processing method that reflects the light from the light source to a DMD element including a micro-mirror so as to project the image having the striped pattern.

A substrate inspection apparatus according to one embodiment of the present disclosure includes a light projector and a measuring device. The light projector includes a patterned light projection apparatus including a lens that is positioned on an optical path such that light beams from a light source pass through a grating and an aperture and converge on an irradiated surface, the grating has a striped pattern in which transmissive portions configured to transmit light from the light source and shielding portions configured to block the light from the light source are alternately arranged, and a light pattern is formed on the irradiated surface in a sinusoidal shape by adjusting the grating and the aperture through which the light beams from the light source pass.

A substrate inspection apparatus according to another embodiment includes a light projector and a measuring device. The projector includes a patterned light projection apparatus including a lens that is positioned on an optical path such that light beams from a light source pass through an aperture and converge on an irradiated surface, the light source is configured to project an image having a striped pattern, and a light pattern is formed on the irradiated surface to have a contrast in a sinusoidal shape by adjusting the aperture through which the light beams from the light source pass.

A patterned light projection method according to an embodiment of the present disclosure includes performing a defocusing projection by defocusing patterned light projected from the patterned light projection apparatus of the present disclosure and projecting the patterned light of a sinusoidal shape to the object.

The patterned light projection method according to another embodiment of the present disclosure further includes performing a focusing projection, before the defocusing projection, by projecting patterned light of the sinusoidal shape such that the patterned light projected from the patterned light projection apparatus is focused on the object, and the defocusing projection includes adjusting a positional relationship between the light source and the aperture so as to project the pattern light of the sinusoidal shape after the focusing projection.

In a patterned light projection apparatus according to various embodiments of the present disclosure, even if a striped grating having only a simple on-off pattern is used, it is possible to form and project patterned light that is necessary for measuring a three-dimensional shape in which light and dark patterns follow an ideal sinusoidal wave, and thus, it is possible to obtain a precise three-dimensional shape of an object.

In addition, according to the patterned light projection apparatus, even though a simple on-off type striped grating is used without using a complicated grating used for projecting patterned light in which lightness and darkness vary according to the related art, it is possible to project patterned light in which lightness and brightness vary, so that the manufacturing cost of the grating can be reduced and a more precise patterned light can be projected.

In addition, patterned light projection apparatus using an optical panel is capable of projecting patterned light having higher resolution compared to a conventional method.

In addition, with the patterned light projection apparatus, it is possible to project patterned lights having various periods by changing the position of the grating even under the same projection condition.

In addition, with the patterned light projection apparatus, it is possible to acquire a more precise three-dimensional image by maximizing the difference in contrast between bright portions and dark portions of the patterned light.

BRIEF DESCRIPTION OF THE DRAWINGS

FIG. 1 illustrates a three-dimensional shape measuring apparatus utilizing a conventional patterned light projection apparatus.

DETAILED DESCRIPTION

Hereinafter, embodiments of the present disclosure will be described with reference to the drawings. Although specific words are used to describe embodiments of the present disclosure, those skilled in the art will recognize that such terms are not used to limit the scope of the present disclosure.

The present disclosure describes an invention for projecting patterned light in a sinusoidal form of an ideal shape for a three-dimensional image measurement, in which the patterned light in a sinusoidal form may be expressed as patterned light of a sinusoidal wave, patterned light having a sinusoidal wave shape, patterned light in the form of a sinusoidal wave, etc. However, those skilled in the art will understand that these terms all refer to the same type of patterned light.

The present disclosure includes a method of projecting patterned light in the form of a sinusoidal pattern using a striped pattern grating in which shielding portions that completely block light and transmissive portions, which transmit light completely therethrough, are alternately provided. In the present disclosure, a structure referred to as a "striped grating" refers to a pattern grating in which transmissive portions (opening portions) and shielding portions alternate. As used herein, the term "on-off pattern grating" may be used to refer to a striped pattern grating, and other terms representing a pattern grating in which transmissive portions and shielding portions alternate may also be used.

Figure 2A:
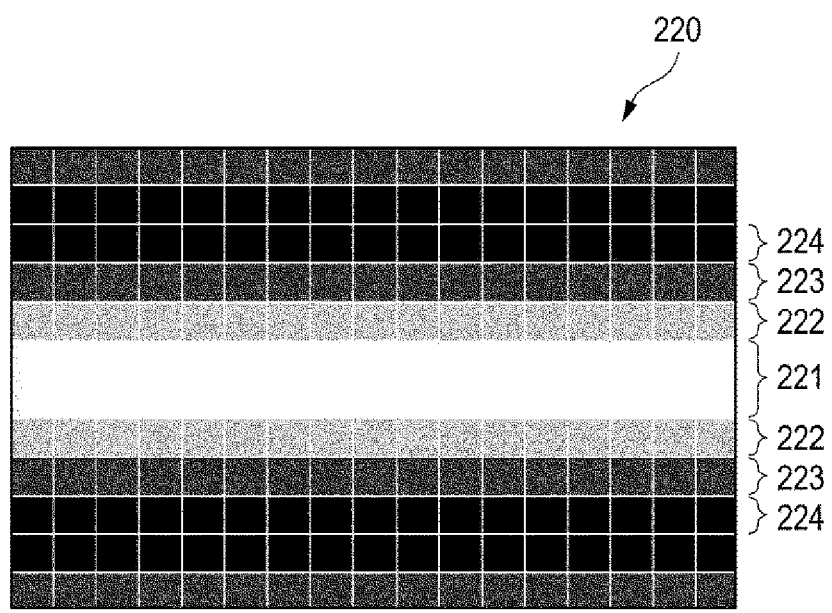
FIG. 2 illustrates a grating used in a conventional patterned light projection apparatus for projecting patterned light of a sinusoidal form and the form of the patterned light generated from the conventional patterned light projection apparatus.
Figure 2B:
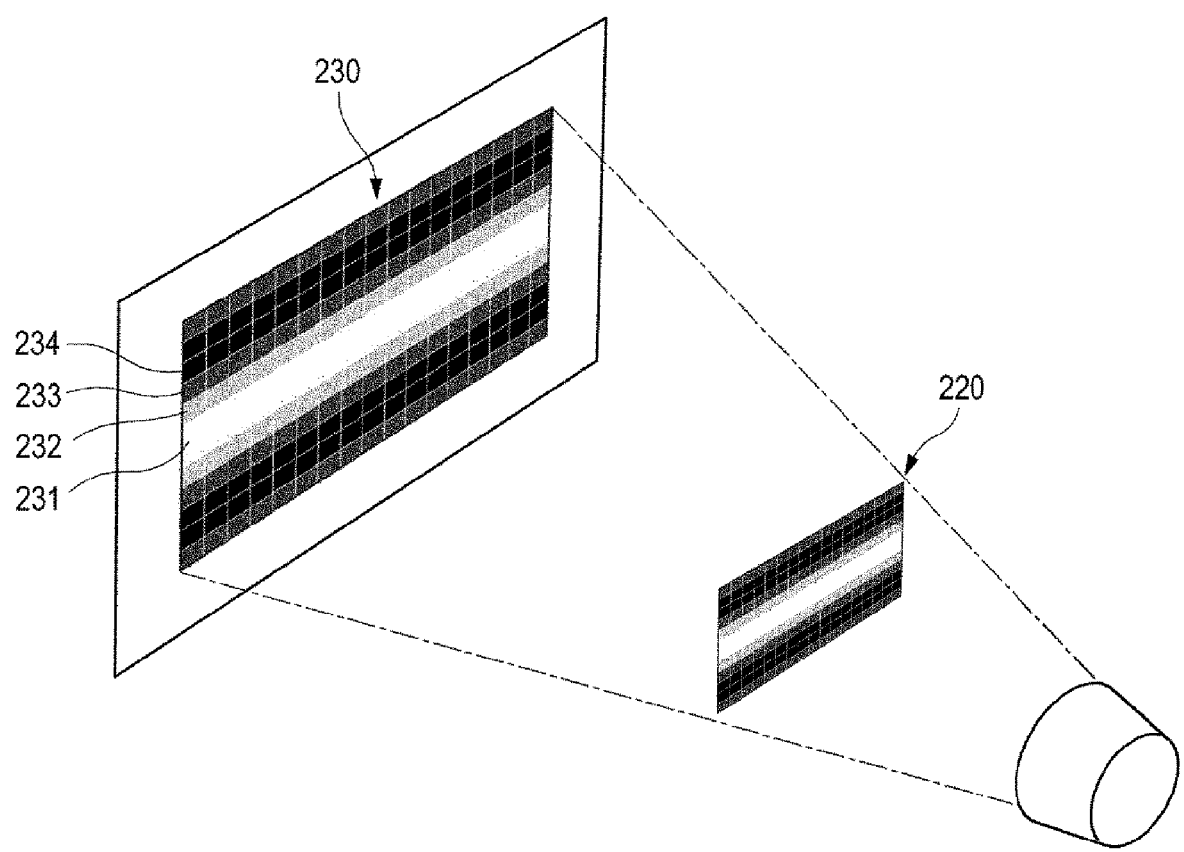
Figure 3:
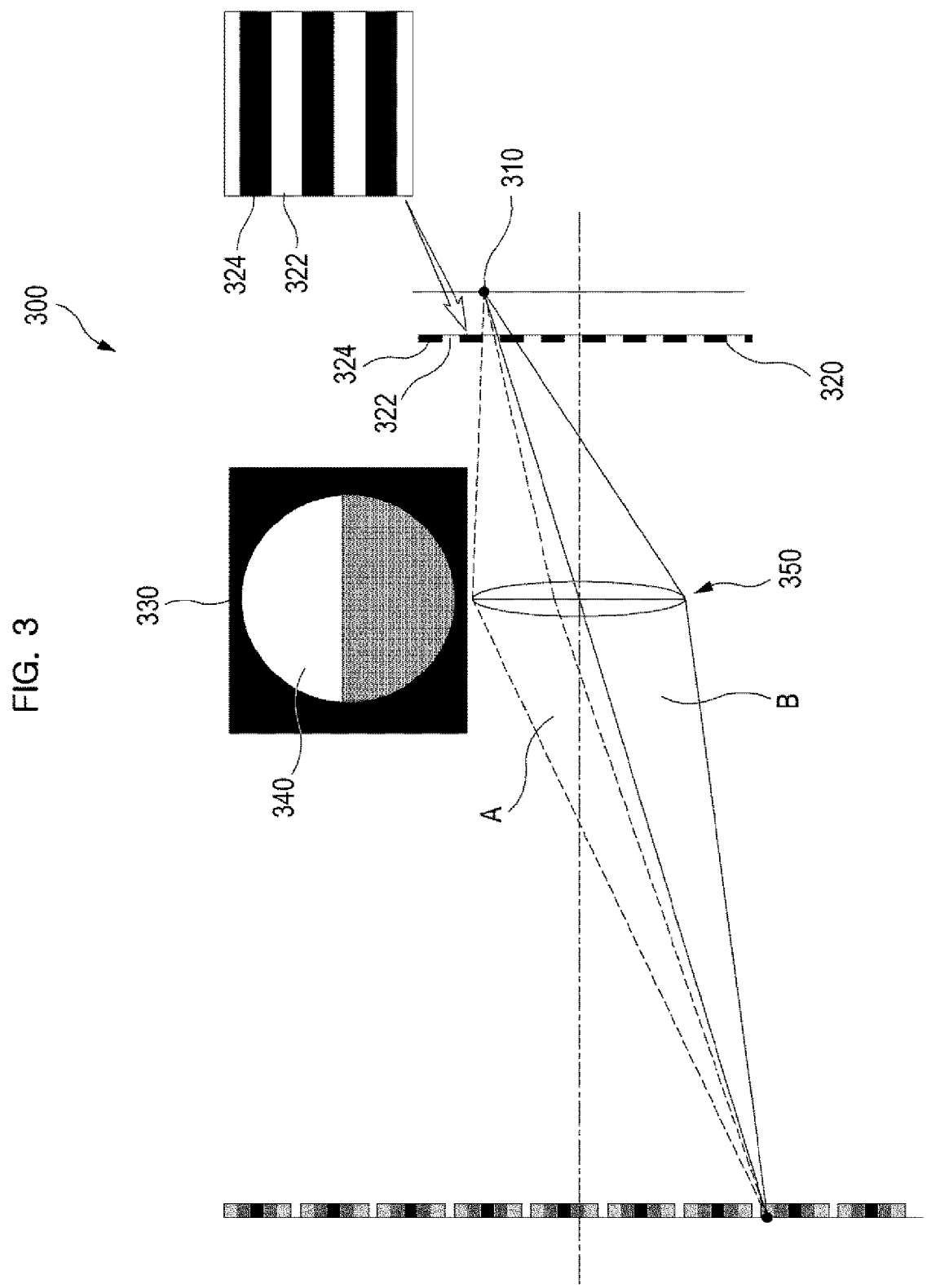
FIG. 3 illustrates a patterned light projection apparatus according to an embodiment of the present disclosure and projection of patterned light using the same.

FIG. 3 illustrates a patterned light projection apparatus according to an embodiment of the present disclosure. A patterned light projection apparatus 300 includes a light source 310, a grating 320, an aperture 330, and a lens 350, and the aperture 330 includes an opening 340.

Hereinafter, the operation of the patterned light projection apparatus will be described. Light from the light source 310 passes through the grating 320, then enters the lens 350 through the opening 340 of the aperture 330, and is finally incident on a surface of an inspection object 380, which is an image-forming surface, for example, a surface of a substrate. Some of the light beams of the light from the light source are blocked by the shielding portions 324 of the grating 320, thereby forming shadows on the image-forming surface, that is, dark portions of the pattern and the light beams passing through the transmissive portions 322 of the grating 320 form bright portions of the pattern on the image-forming surface.

The light source 310 may be a conventional light source utilized for projecting patterned light. The light source 310 may be a simple white light source, or a digital projector using an optical panel or the like as described above.

The grating 320 is a striped grating having transmissive portions 322 and shielding portions 324. The transmissive portions 322 are opening portions of the grating, and the light from the light source is transmitted through the transmissive portions 322 and projected toward the object so as to be projected to the surface of the inspection object (image-forming surface). The shielding portions 324 block light from the light source, and shadows are generated in the regions on the object where light is blocked by the shielding portions 324. The grating has a form in which transmissive portions and shielding portions are alternately arranged. The respective widths of the transmissive portions and the shielding portions of the grating may vary depending on the pitch of the patterned light to be projected.

The aperture 330 has an opening 340, and the light passing through the grating 320 passes through the opening 340 of the aperture 330, so that the light can be projected onto the object through the lens 350. Because the transmissive portions 322 and the shielding portions 324 of the grating alternate, the light passing through the transmissive portions 322 can pass through the opening 340 of the aperture 330. When the light is not transmitted by being blocked by the shielding portions 324, a shadow is also formed at a corresponding position in the opening 340 of the aperture 330 (B).

A focused range, that is, the depth of field may be adjusted through a method of adjusting the distances among the light source 310, the grating 320, the lens 350, and the image-forming plane 380 when the light passing through the lens 350 reaches the image-forming surface 380, a method of adjusting the size of the opening 340 of the aperture 330, or the like. Since the light from the light source 310 is partially blocked by the grating 320 to form a shadow of a striped pattern, when the respective components of the patterned light projection apparatus are adjusted so as to be accurately focused on the image-forming surface 380, an accurately striped pattern is formed. Therefore, when the depth of field is changed by adjusting the distance between the components and the size of the aperture in the condition that the image is formed correctly, it is possible to perform defocusing or out-focusing, in which an image is formed in a blurred form rather than accurately formed on the inspection object, or it is possible to obtain a "bokeh effect".

When an image is defocused instead of being focused on the image-forming surface, bright portions formed on the irradiated surface as the light from the light source 310 passes through the transmissive portions 322 of the pattern grating 320 and shadow portions formed on the irradiated surface as the light from the light source 310 is blocked by the shielding portions 324 of the pattern grating 320 are changed in brightness and enlarged in area as the focus is blurred. Accordingly, it is possible to project patterned light of a sinusoidal form in which the brightness change of the pattern becomes similar to a sinusoidal wave as the bright portions and the shadow portions are partially overlapped each other.

Figure 4:
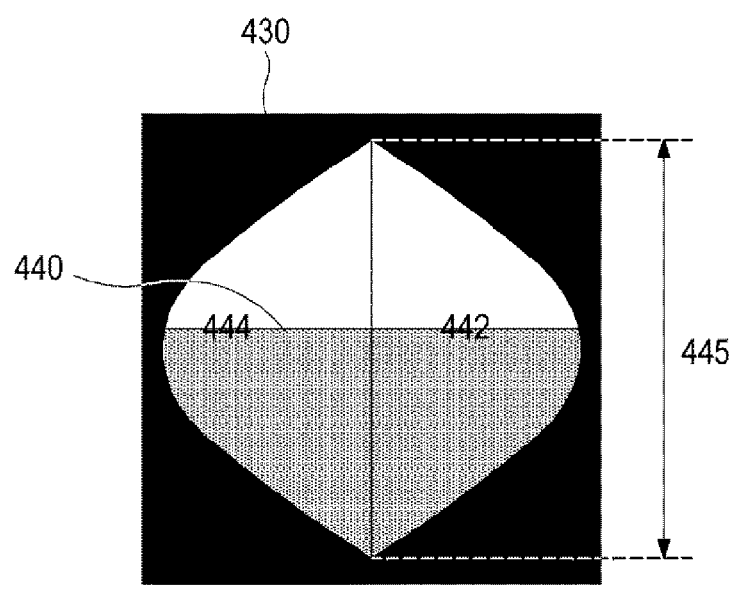
FIG. 4 illustrates an example of the shape of an aperture that can be used in a patterned light projection apparatus according to an embodiment of the present disclosure.

The shape of the opening of the aperture may vary. As illustrated in FIG. 3, the opening may be a circular opening 340 similar to the shape of a general aperture. However, it is possible to use an opening 440 of an aperture 430, the outline of which has a sinusoidal wave curve shape that is symmetrical with respect to the vertical direction as illustrated in FIG. 4. Specifically, when the opening of the aperture has a shape as illustrated in FIG. 4, patterned light having the most ideal sinusoidal form may be projected.

However, it is not always necessary to use an aperture in the form of a sinusoidal wave. In consideration of the quality of a three-dimensional image to be acquired or the processing cost of the aperture, it is possible to utilize the above-described circular aperture or apertures having another appropriate shape such as an elliptical shape, another similar curve shape, or a polygonal shape.

Through the above-described patterned light projection apparatus of the present disclosure, it is possible to enhance the quality of a three-dimensional image by projecting patterned light in the form of an ideal sinusoidal wave even if only a simple striped grating is used. In addition, when manufacturing a grating, it is possible to form patterned light having a fine pitch and to minimize the size of the grating by fabricating the grating as an on-off type striped grating by processing the grating in the smallest processable fine unit.

Figure 5:
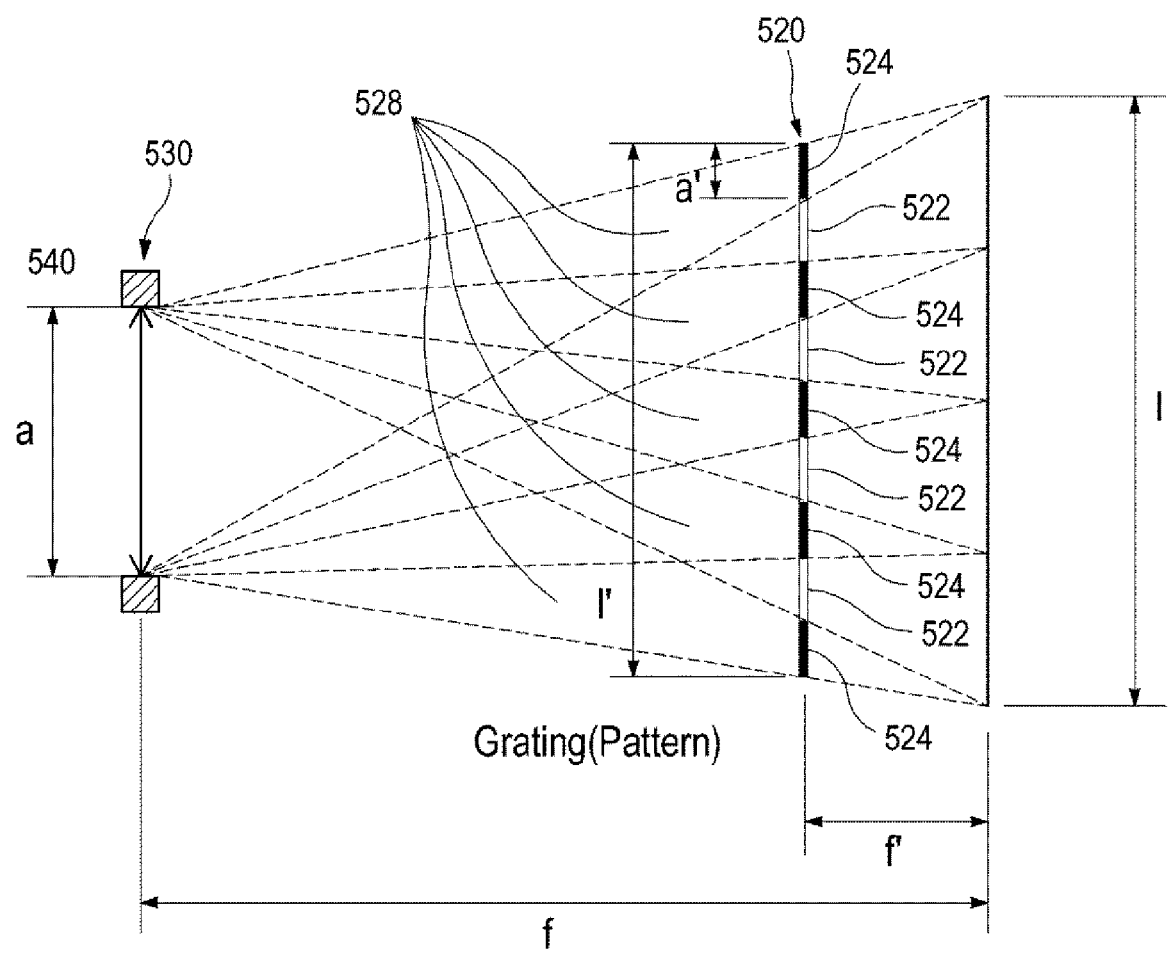
FIG. 5 illustrates the influence of a distance variation between an aperture, a grating, and a light source when the patterned light projection apparatus according to an embodiment of the present disclosure projects the patterned light.

FIG. 5 is a view for explaining a distance relationship between an aperture and a grating in a patterned light projection apparatus according to an embodiment of the present disclosure. An ideal sinusoidal patterned light should have a maximum difference in contrast between the brightest portion and the darkest portion of the pattern formed on the image-forming surface by the patterned light. Further, the ideal sinusoidal pattern should be the same as or similar to a sinusoidal wave curve in the form of a change in the contrast of the patterned light between the brightest portion and the darkest portion. As described above, it is possible to acquire a change in the contrast in the form, which is the same as a sinusoidal wave curve shape by projecting light, which has passed through an aperture having an opening having the sinusoidal wave curve shape in cross section, to the object in a defocused state. On the other hand, in order to maximize the difference in contrast between the brightest portion and the darkest portion, the light should not pass through the aperture at all when the light is blocked by the shadow of the shielding portions of the grating, and all the light passing through the transmissive portions of the grating should be able to pass through the opening of the aperture without loss.

It is possible to achieve the conditions described above when the vertical width of the shadows 528 formed by the shielding portions 524 of the grating 520 is larger than the height of the opening 540, that is, the vertical width at the position of the aperture 530 such that the shadows 528 cover the entire opening 540, as illustrated in FIG. 5. In the configuration of FIG. 5, the difference in brightness between the bright portions and the dark portions of the sinusoidal patterned light is maximized. The positional relationship as in FIG. 5 can be achieved by adjusting the size of the opening of the aperture and the size of the shielding portions/transmissive portions of the grating, or adjusting the distance between the grating and the aperture. When the distance between the grating and the aperture is increased, the shadow of the shielding portions of the grating is increased. On the contrary, when the distance between the grating and the aperture is decreased, the shadow of the shielding portions of the grating is decreased. Therefore, by adjusting the positional relationship between the grating and the aperture such that the shadow of the shielding portions covers the opening of the aperture, it is possible to project patterned light in which the difference in contrast between a bright portion and a dark portion is maximized through the patterned light projection apparatus according to the present disclosure.

Through the above-described embodiments, a patterned light projection apparatus has been described in which light from a light source passes through a grating including shielding portions and transmissive portions and is defocused on an image-forming surface, thereby projecting patterned light in the form of a sinusoidal wave. Alternatively, a method of projecting patterned light using a digital projector of a digital light processing type using an LCD, an LCOS, or a DMD element instead of passing the light from the light source through a grating is also possible. For example, when a digital projector using a DMD element is used, light projected from a light source can be reflected on a chip including a micro-driving mirror so as to project a pattern or an image. When the digital projector is used as described above, the patterned light can be projected by projecting a striped image, rather than needing a grating as in the conventional method. In particular, projecting the patterned light in the form of a sinusoidal wave using the defocusing principle of the present disclosure can be similarly implemented in a patterned light projection apparatus using a digital projector.

Figure 6:
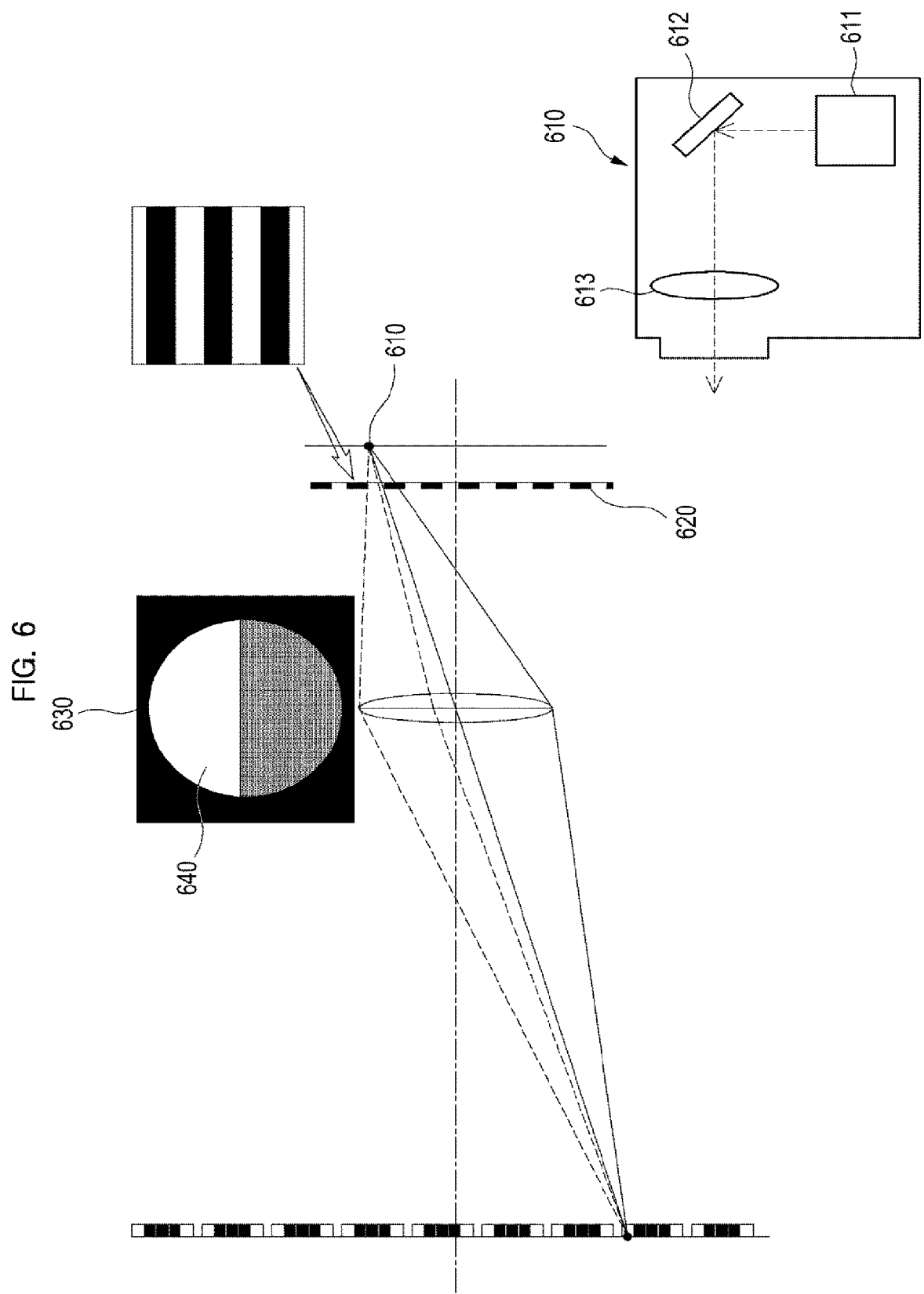
FIG. 6 illustrates a patterned light projection apparatus according to another embodiment of the present disclosure and projection of patterned light using the same.

FIG. 6 illustrates a patterned light projection apparatus according to another embodiment of the present disclosure, which forms patterned light by projecting a pattern image through a digital projector. The patterned light projection apparatus of FIG. 6 includes a projector 610 configured to project patterned light in a digital light source processing method using a DMD element. The projector 610 includes a light source 611, a mirror 612, and a lens 613, and the mirror 612 may be a DMD element in which micro-mirrors are integrated. By the control of the DMD element, it is possible to directly project a striped patterned light with an aperture in the form of passing through a grating even if a separate grating is not included. Although only the projector using a DMD device has been described for illustrative purposes, it is apparent that other types of projectors capable of projecting a digital image may also be utilized in the case where an LCD or LCOS device is used and so on. A configuration in which defocusing is performed such that a pattern image passes through the grating and the focal point does not exactly coincide with the image-forming surface so as to form patterned light in the form of a sinusoidal wave on the image plane, and an aspect in which the contrast ratio of the bright portions and the dark portions of a projected pattern is maximized in the state in which the pattern image is equal to or larger than the vertical width of the opening of the aperture are the same as the principles described above with reference to FIGS. 3 to 5, and therefore a description thereof will be omitted in the following.

The present disclosure has been described and exemplified by the embodiments as described above. However, those skilled in the art will be aware that the configuration of the present disclosure, including that the patterned light projection apparatus described in the above description includes only one aperture and one lens are provided merely for illustrative purposes, and that the configuration of the present disclosure can be variously changed and modified without departing from the spirit and scope of the appended claims, including that there may be provided a plurality of apertures and lenses.

What is claimed is:

1. A patterned light projection apparatus comprising:
    a light source;
    a grating;
    an aperture; and
    a lens that is positioned on an optical path such that light from the light source passes through the grating and the aperture and converges on an irradiated surface,
    wherein the grating has a striped pattern in which transmissive portions configured to transmit the light from the light source and shielding portions configured to block the light from the light source are alternately arranged, and
    wherein a light pattern is formed on the irradiated surface in a sinusoidal shape by adjusting positions of the grating and the aperture such that a vertical width of a shadow that is formed at the position of the aperture by the shielding portions of the grating is equal to or larger than a vertical width of an opening of the aperture.

2. The patterned light projection apparatus of claim 1, wherein the sinusoidal shape is adjustable by changing a size of the opening of the aperture.

3. The patterned light projection apparatus of claim 1, wherein the sinusoidal shape is adjustable by changing a distance between the light source and the grating, a distance between the grating and the aperture, or a distance between the aperture and the light source.

4. The patterned light projection apparatus of claim 1, wherein the opening of the aperture has a combined shape that is obtained by combining curves to be symmetrical to each other.

5. The patterned light projection apparatus of claim 4, wherein the combined shape is a circular shape or an elliptical shape.

6. The patterned light projection apparatus of claim 1, wherein the opening of the aperture has a combined shape (440) that is obtained by combining two half-period sinusoidal wave shapes (442, 444) to be symmetrical to each other with respect to a direction perpendicular to the striped pattern.

7. The patterned light projection apparatus of claim 1, wherein the opening of the aperture has a polygonal shape.

8. The patterned light projection apparatus of claim 1, wherein the light source is one of a light source of a Digital Light Processing method using a Digital Micromirror Device (DMD) element, an LED light source, and an LCD light source.

9. A three-dimensional substrate inspection apparatus comprising a light projector and a measuring device, wherein the light projector includes the patterned light projection apparatus of claim 1.

10. A patterned light projection method that projects patterned light to an object using the patterned light projection apparatus of claim 1, comprising:
    performing a defocusing projection by defocusing the patterned light projected from the patterned light projection apparatus and projecting the patterned light of a sinusoidal shape to the object.

11. The patterned light projection method of claim 10, further comprising:
    performing a focusing projection, before the defocusing projection, by projecting the patterned light of the sinusoidal shape such that the patterned light projected from the patterned light projection apparatus is focused on the object,
    wherein the defocusing projection includes adjusting a positional relationship between the light source and the aperture so as to project the patterned light of the sinusoidal shape after the focusing projection.

12. A patterned light projection apparatus comprising:
    a light source configured to project an image having a striped pattern;
    an aperture; and
    a lens that is positioned on an optical path such that light from the light source passes through the aperture and converges on an irradiated surface, wherein a light pattern is formed on the irradiated surface in a sinusoidal shape by adjusting a position of the aperture such that a vertical width of a dark portion of the striped pattern that is formed at the position of the aperture is equal to or larger than a vertical width of an opening of the aperture.

13. The patterned light projection apparatus of claim 12, wherein the sinusoidal shape is adjustable by changing a distance between the aperture and the light source.

14. The patterned light projection apparatus of claim 12, wherein the light source uses a Digital Light Processing method that reflects the light from the light source to a DMD element including a micro-mirror so as to project the image having the striped pattern.

\* \* \* \* \*